United States Patent
Ngo et al.

(10) Patent No.: US 11,188,852 B2
(45) Date of Patent: Nov. 30, 2021

(54) AUTOMATED TICKET COMPARISON AND SUBSTITUTION RECOMMENDATION SYSTEM

(71) Applicant: StubHub, Inc., San Francisco, CA (US)

(72) Inventors: Sandy Ngo, San Francisco, CA (US); Adriane McFetridge, San Francisco, CA (US); Randolph Minde, San Francisco, CA (US); Christopher Pierce, San Francisco, CA (US); James Suller, San Francisco, CA (US); Wagner Gomez, San Francisco, CA (US)

(73) Assignee: StubHub, Inc., Francisco (CA)

( * ) Notice: Subject to any disclaimer, the term of this patent is extended or adjusted under 35 U.S.C. 154(b) by 112 days.

(21) Appl. No.: 16/830,692

(22) Filed: Mar. 26, 2020

(65) Prior Publication Data

US 2020/0226500 A1    Jul. 16, 2020

Related U.S. Application Data

(63) Continuation of application No. 14/586,220, filed on Dec. 30, 2014, now Pat. No. 10,614,384.

(51) Int. Cl.
 *G06Q 10/02*    (2012.01)
(52) U.S. Cl.
 CPC .................... *G06Q 10/02* (2013.01)
(58) Field of Classification Search
 CPC .................................................... G06Q 10/02
 See application file for complete search history.

(56) References Cited

U.S. PATENT DOCUMENTS 7,412,442 B1    8/2008    Vadon et al.
7,584,123 B1    9/2009    Karonis et al.
(Continued)

FOREIGN PATENT DOCUMENTS

WO    2002069078 A1    9/2002

OTHER PUBLICATIONS

Moe, et al., The Role of Price Tiers in Advance Purchasing of Event Tickets, Journal of Service Research, vol. 12, No. 1, Aug. 2009, pp. 73-86 (Year: 2009).*

(Continued)

*Primary Examiner* — Daniel Vetter
(74) *Attorney, Agent, or Firm* — McDermott Will & Emery LLP

(57) ABSTRACT

Systems and methods for creating a recommendation engine of a process modeling server and automatically comparing tickets by the recommendation engine are disclosed. The recommendation engine may be generated by digitizing a seat map of a venue that characterizes one or more interrelationships between the seats. After creation, the process modeling server receives a notification that a ticket holder's ticket to an event taking place at a venue has been cancelled or become otherwise unavailable. The process modeling server compares one or more attributes of the now-unavailable ticket to one or more rules maintained by a recommendation engine of the process modeling server. The recommendation engine generates one or more substitute ticket alternatives based on the comparison for selection. The recommendation engine may refine the one or more rules over time based on actual customer selection.

20 Claims, 10 Drawing Sheets

(56) References Cited

U.S. PATENT DOCUMENTS

| | | |
|---|---|---|
| 7,778,853 B2 | 8/2010 | Sussman et al. |
| 10,614,384 B2 | 4/2020 | Ngo et al. |
| 2002/0077931 A1 | 6/2002 | Henrion et al. |
| 2003/0066883 A1 | 4/2003 | Yu |
| 2003/0069827 A1 | 4/2003 | Gathman et al. |
| 2003/0202017 A1 | 10/2003 | Fukuoka et al. |
| 2004/0158536 A1* | 8/2004 | Kowal .................. G06Q 10/02 705/400 |
| 2004/0230440 A1 | 11/2004 | Malhotra |
| 2007/0033110 A1 | 2/2007 | Philipp et al. |
| 2008/0004917 A1 | 1/2008 | Mortimore |
| 2008/0103934 A1 | 5/2008 | Gibson et al. |
| 2008/0162211 A1 | 7/2008 | Addington |
| 2008/0189147 A1 | 8/2008 | Bartlett |
| 2008/0255889 A1 | 10/2008 | Geisler et al. |
| 2009/0006143 A1 | 1/2009 | Orttung et al. |
| 2009/0006373 A1 | 1/2009 | Chakrabarti et al. |
| 2009/0204600 A1 | 8/2009 | Kalik et al. |
| 2009/0287687 A1 | 11/2009 | Martire et al. |
| 2010/0057743 A1 | 3/2010 | Pierce |
| 2010/0070888 A1 | 3/2010 | Watabe et al. |
| 2010/0082374 A1 | 4/2010 | Charania et al. |
| 2010/0257002 A1 | 10/2010 | Brett |
| 2010/0287033 A1 | 11/2010 | Mathur |
| 2011/0238454 A1 | 9/2011 | Nestor et al. |
| 2012/0010911 A1 | 1/2012 | Lele et al. |
| 2012/0078667 A1 | 3/2012 | Denker et al. |
| 2012/0095862 A1 | 4/2012 | Schiff et al. |
| 2012/0191551 A1 | 7/2012 | Lutnick et al. |
| 2012/0226575 A1 | 9/2012 | Goldberg et al. |
| 2012/0323488 A1 | 12/2012 | Callaghan |
| 2013/0317868 A1 | 11/2013 | Diamond et al. |
| 2013/0332525 A1 | 12/2013 | Liu et al. |
| 2014/0019172 A1 | 1/2014 | Oxenham et al. |
| 2014/0058766 A1 | 2/2014 | Yu et al. |
| 2014/0142994 A1 | 5/2014 | Matarazz et al. |
| 2014/0278591 A1 | 9/2014 | Blecharczyki et al. |
| 2015/0052001 A1 | 2/2015 | Yuan |
| 2015/0066546 A1 | 3/2015 | Scarborough et al. |
| 2015/0161525 A1 | 6/2015 | Hirose et al. |
| 2015/0161528 A1 | 6/2015 | Yalcin et al. |
| 2015/0242889 A1 | 8/2015 | Zamer et al. |

OTHER PUBLICATIONS

Zhao, et al., A Dynamic Model for Airline Seat Allocation with Passenger Diversion and No-Shows, Transportation Science, vol. 35, No. 1, Feb. 2001 pp. 80-98 (Year: 2001).*
US Office Action in U.S. Appl. No. 13/966,649, dated Dec. 24, 2014, 19 pgs.
US Office Action in U.S. Appl. No. 13/966,649, dated Apr. 28, 2015, 25 pgs.
US Office Action in U.S. Appl. No. 13/966,649, dated Nov. 24, 2015, 25 pgs.
US Office Action in U.S. Appl. No. 13/966,649, dated Apr. 13, 2016, 24 pgs.
US Office Action in U.S. Appl. No. 13/966,649, dated Sep. 15, 2016, 23 pgs.
US Office Action in U.S. Appl. No. 13/966,649, dated Apr. 12, 2017, 29 pgs.
US Office Action in U.S. Appl. No. 13/966,649, dated Sep. 21, 2017, 26 pgs.
US Office Action in U.S. Appl. No. 13/966,649, dated Apr. 24, 2018, 22 pgs.
US Office Action in U.S. Appl. No. 13/966,649, dated Sep. 25, 2018, 11 pgs.
US Office Action in U.S. Appl. No. 13/966,649, dated Jan. 29, 2019, 12 pgs.
US Office Action in U.S. Appl. No. 13/966,649, dated Nov. 10, 2020, 10 pgs.
Stubhub, User Agreement and FanProtect Guarantee (linked to in the User Agreement), WebArchive pages from www.stubhub.com dated Aug. 23-Oct. 11, 2013, 10 pgs.
US Office Action in U.S. Appl. No. 13/966,649, dated Feb. 23, 2021, 11 pgs.

* cited by examiner

AUTOMATED TICKET COMPARISON AND SUBSTITUTION RECOMMENDATION SYSTEM

CROSS-REFERENCE TO RELATED APPLICATIONS

This application is a continuation of U.S. patent application Ser. No. 14/586,220, filed on Dec. 30, 2014, now U.S. Pat. No. 10,614,384, issued on Apr. 7, 2020; the disclosure of which is incorporated herein by reference in its entirety.

BACKGROUND

Field of the Invention

The present disclosure generally relates to events, and more particularly to automated comparison of a ticket with possible ticket substitution alternatives and recommendation of ticket substitution alternatives.

Related Art

Tickets for live entertainment events may be purchased using online and/or mobile payment systems, for example with the aid of an on-line or mobile payment service provider such as, for example, PayPal, Inc. of San Jose, Calif. Online marketplaces such as, for example, those provided by StubHub, a subsidiary of EBay Inc. of San Jose, Calif., may provide services for buyers and sellers of tickets for such live entertainment events, and payment provider systems may enable users to buy and/or sell those tickets to other users.

At times, a seller of a ticket cannot or will not fulfill an order for a ticket made by a buyer. Where the buyer purchased the ticket through an online marketplace, the online marketplace often bears the burden of helping identify what ticket may qualify as a substitute ticket instead of providing a refund to the buyer. Currently, this requires a customer service representative of the online marketplace to manually review where the cancelled ticket was located, manually compare that with a seat map of the venue for the event, and manually identify possible alternatives for a substitute ticket that the customer service representative then presents to the ticket buyer. This often involves a fair amount of subjective judgment by the customer service representative, which introduces sometimes significantly different customer service experiences for different ticket buyers as well as requires a significant amount of time and resources to provide.

Thus, there is a need for an automated ticket comparison and substitution recommendation system.

Figure 1:
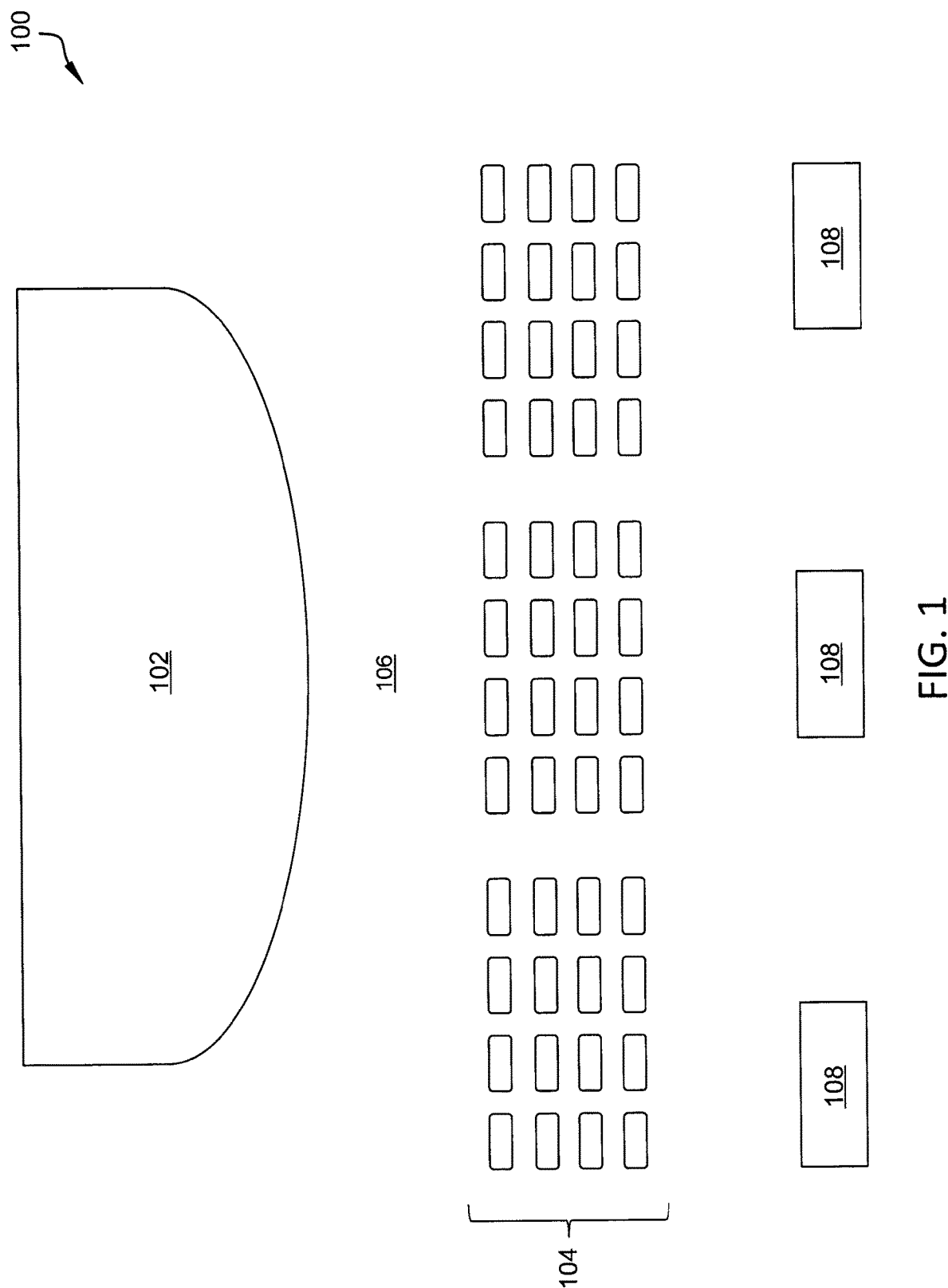
FIG. 1 is a schematic top view illustrating an embodiment of an event venue.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for automatically comparing tickets. For example, a process modeling server may be used to create a recommendation engine. The process modeling server may create the recommendation engine by digitizing a seat map for a venue (or multiple seat maps for multiple venues) to create a proximity matrix that describes a relationship between each of the seats in a given seat map. The relationship may indicate a level of preference for specific seats based on proximity to a seat associated with an unavailable seat, for example by scoring each seat in reference to the unavailable seat. The process modeling server may generate one or more rules based on the proximity matrix and other attributes (e.g. ticket price, seat accessibility, etc.). The one or more rules may be refined over time to provide better recommendations based on actual customer ticket selection of generated alternatives.

After the recommendation engine is created, the process modeling server may use the recommendation engine to compare ticket attributes to identify one or more substitute ticket alternatives. The process modeling server receives a notification that a ticket holder's ticket to an event taking place at a venue has been cancelled or become otherwise unavailable. The process modeling server compares one or more attributes of the now-unavailable ticket to one or more rules maintained by the recommendation engine. In some embodiments, the process modeling server may customize the one or more rules to create a personalized rule set based on one or more customer-specific characteristics of the customer holding or considering the now-unavailable ticket, which may take into consideration how the customer may use the ticket (e.g. to re-sell the ticket or to attend the event) and a prediction of how much the customer may desire to attend the specific event. This may enable a more flexible comparison that can provide a broader assortment of substitute ticket alternatives for the customer. The recommendation engine generates one or more substitute ticket alternatives based on the comparison for selection, e.g. by the server automatically, by the customer, or by a representative. The recommendation engine may also determine a confidence level for each alternative that identifies how likely the customer is to select a given alternative. The recommendation may automatically accept an alternative based on the alternative having a confidence level above a given threshold. Alternatively, the recommendation engine may provide the most likely alternatives to the customer for the customer to select. The selection may be used to refine the rules to improve the likelihood that the top-rated alternative by the recommendation engine corresponds to the alternative the customer actually would select, such that substitute ticket recommendations may be customer specific and may be different for two customers who both purchase similar tickets (e.g., similar price and seat location for an event). In another alternative, the recommendation engine may provide the alternatives to a customer service representative to select an alternative or to provide to the customer during a service call for selection.

In this manner, embodiments of the present disclosure enable the automated comparison of tickets to identify possible equivalent (or near-equivalent) substitute ticket recommendations to customers for tickets of interest that have become unavailable (e.g., tickets that are already purchased or identified for possible purchase in the future). As a result, the amount of time required to generate substitute ticket alternatives is reduced and more desirable substitute tickets may be provided, as well as reduce the amount of people required to provide substitutions to customers.

Referring now to FIG. 1, an embodiment of a venue 100 is illustrated. The illustrated embodiment of the venue 100 includes a stage 102, a seating area 104, a standing area 106 between the stage 102 and the seating area 104, and a plurality of vendor areas 108. The venue 100 provides for the occurrence of one or more events associated with one or more event types. An event type may be, for example, a sporting event (e.g., tennis tournament), music concert (e.g., symphony), graduation ceremony, a theatre event (e.g., movie or play), and/or a variety of other events known in the art. One of skill in the art in possession of the present disclosure will recognize that any venue including, for example, music venues providing for music events, sporting venues, theater venues, presentation venues, and/or a variety of other venues at which associated events are held will fall within the scope of the present disclosure. Additionally, the event may be a live event (e.g., play) or a pre-recorded event (e.g., screening of a movie).

A user may desire to purchase ticket(s) to an event being held at the venue 100. A ticket provider may provide ticket(s) to the event through, for example, a website. In an example, the ticket provider maintains a merchant server and receives a payment from the user for tickets to the event. The merchant server may be maintained by anyone or any entity that receives money, which includes charities. For example, a purchase transaction may be a donation to charity. In another example, the ticket provider may provide free tickets to the event, and the user may select seats for the event using the website.

Figure 2:
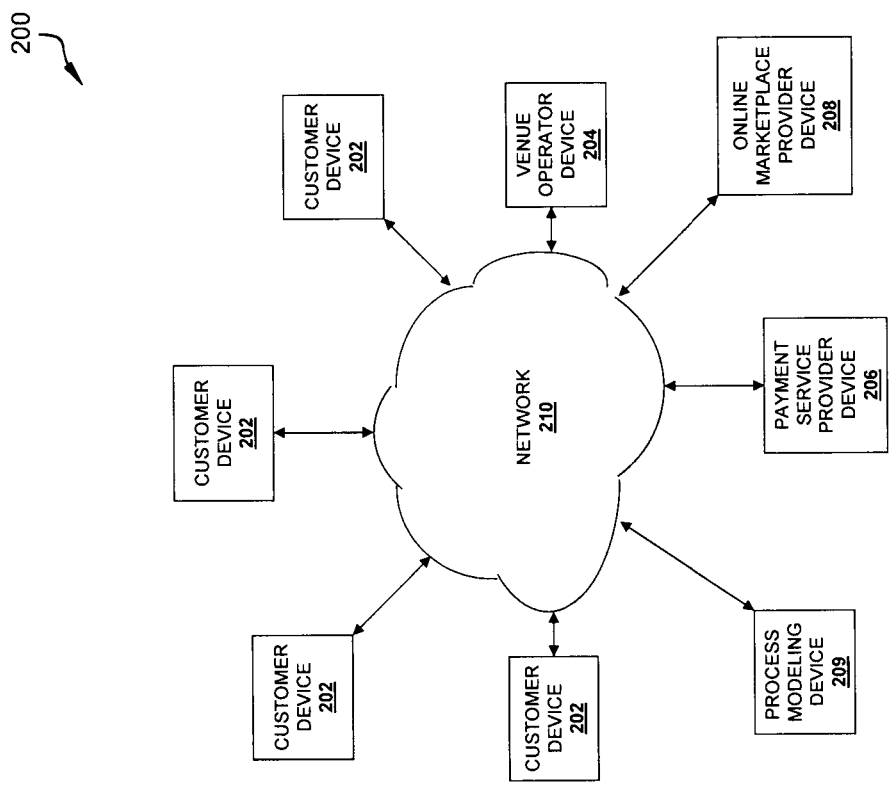
FIG. 2 is a schematic view illustrating an embodiment of a networked system.

Referring now to FIG. 2, an embodiment of a network-based system 200 for implementing one or more processes described herein is illustrated. As shown, the network-based system 200 may include or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 2 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 200 illustrated in FIG. 2 includes a plurality of customer devices 202, a venue operator device 204, a payment service provider device 206, an online marketplace provider device 208, and/or a process modeling device 209 in communication over one or more networks 210. The customer devices 202 may each include a display, processor, input/output, and storage, for example as discussed further below with respect to FIG. 10. The venue operator device 204 may be operated by the venue operators discussed above. The payment service provider device 206 may be operated by a payment service provider such as, for example, PayPal Inc. of San Jose, Calif. The online marketplace provider device 208 may be operated by a online marketplace provider such as, for example, StubHub, a subsidiary of EBay, Inc. of San Jose, Calif. The process modeling devices 209 may be the system provider devices discussed above and may be operated by the system providers discussed above.

The customer devices 202, venue operator device 204, a payment service provider device 206, online marketplace provider device 208, and/or system provider device 209 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of the system 200, and/or accessible over the network 210.

The network 210 may be implemented as a single network or a combination of multiple networks. For example, in various embodiments, the network 210 may include the Internet and/or one or more intranets, landline networks, wireless networks, and/or other appropriate types of networks.

The customer devices 202 may be implemented using any appropriate combination of hardware and/or software configured for wired and/or wireless communication over network 210. For example, in one embodiment, the customer devices 202 may be implemented as a personal computer of a customer in communication with the Internet. In other embodiments, the customer devices 202 may be a smart phone, personal digital assistant (PDA), laptop computer, and/or other types of computing devices. The customer devices 202 each include a chassis having a display and an input device. One of skill in the art will recognize that the customer devices 202 may be portable or mobile phones. However, a variety of other portable/mobile customer devices and/or desktop customer devices may be used without departing from the scope of the present disclosure.

The customer devices 202 may include one or more browser applications which may be used, for example, to provide a convenient interface to permit the customer to browse information available over the network 210. For example, in one embodiment, the browser application may be implemented as a web browser configured to view information available over the Internet. The customer devices 202 may also include one or more toolbar applications which may be used, for example, to provide customer-side processing for performing desired tasks in response to operations selected by the customer. In one embodiment, the toolbar application may display a customer interface in connection with the browser application.

The customer devices 202 may further include other applications as may be desired in particular embodiments to provide desired features to the customer devices 202. In particular, the other applications may include a payment application for payments assisted by a payment service provider through the payment service provider device 206. The other applications may also include security applications for implementing customer-side security features, programmatic customer applications for interfacing with appropriate application programming interfaces (APIs) over the network 210, or other types of applications. Email and/or text applications may also be included, which allow the customer devices 202 to send and receive emails and/or text messages through the network 210. The customer devices 202 may each include one or more customer and/or device identifiers which may be implemented, for example, as operating system registry entries, cookies associated with the browser application, identifiers associated with hardware of the customer devices 202, or other appropriate identifiers, such as a phone number. In one embodiment, the customer identifier may be used by the payment service provider device 206 to associate the customer with a particular account.

Figure 3:
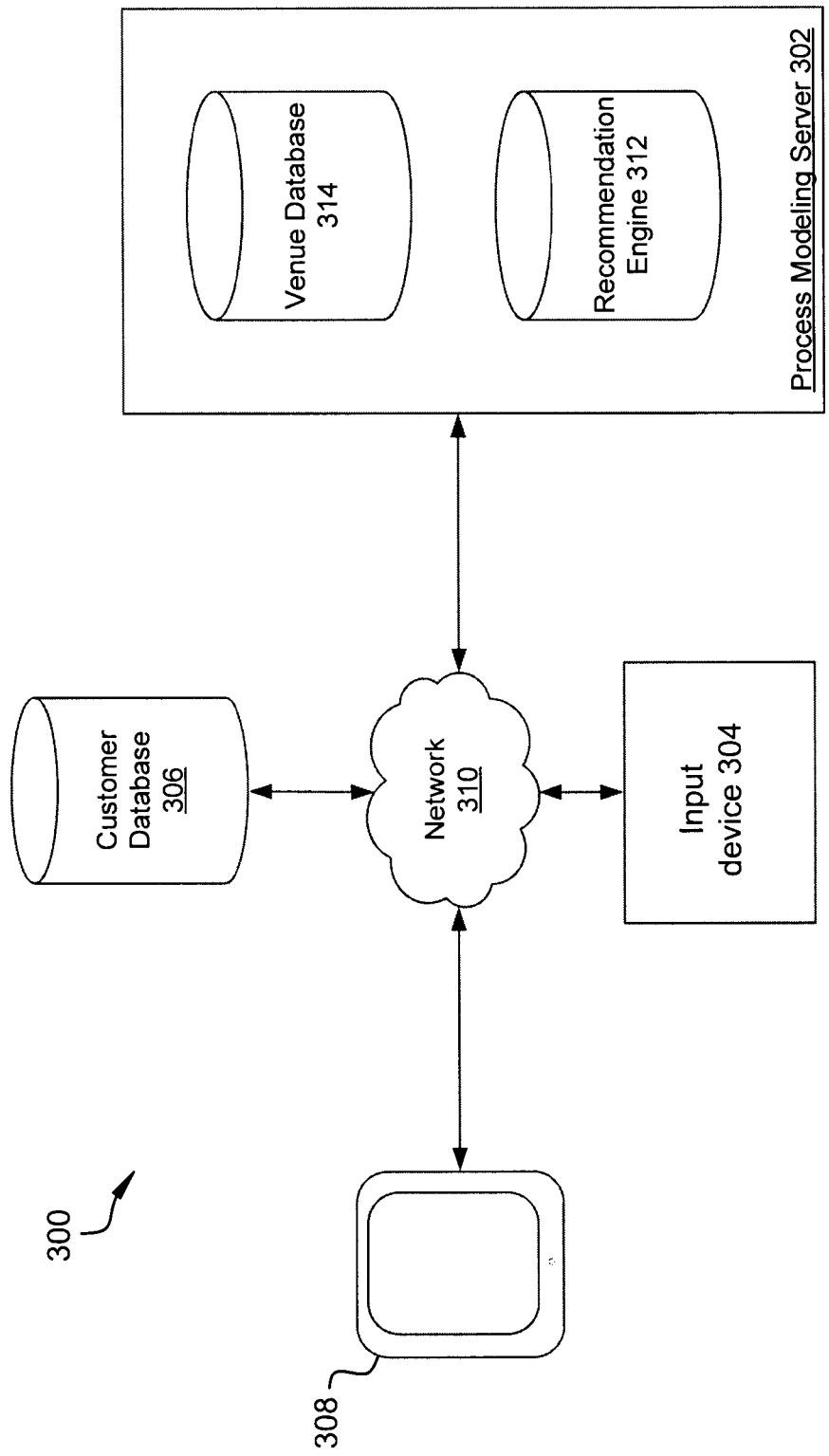
FIG. 3 is a schematic view illustrating an embodiment of an automated ticket comparison and substitution recommendation system.

Referring now to FIG. 3, an embodiment of an automated ticket comparison and substitution recommendation system 300 is illustrated. The automated ticket comparison and substitution recommendation system 300 may include a process modeling server 302, an input device 304, a customer database 306, a customer device 308, all coupled over a network 310. The network 310 may be implemented as a single network or a combination of multiple networks. For example, in various embodiments, the network 310 may include the Internet and/or one or more intranets, landline networks, wireless networks, and/or other appropriate types of networks. The customer device 308 may be an example of the customer devices 202 of FIG. 2.

The process modeling server 302 is a server that is called when a ticket is cancelled/becomes unavailable in order to provide one or more recommendations for a substitute ticket according to embodiments of the present disclosure. In an embodiment, the process modeling server 302 is an example of the process modeling device 209 of FIG. 2. The process modeling server 302 may include a venue database 314 that describes a physical layout of one or more venues, such as the venue 100 described in FIG. 1. The venue database 314 may describe venue data as a seating chart or as a proximity matrix as further described in more detail below. The venue database 314 may maintain venue information for a plurality of venues. In an embodiment, the venue database 314 maintains venue information for different venues according to genres. A first genre may include music performances, a second genre may include theater performances, a third genre may include sporting events, and a fourth genre may include live presentations to name just a few examples. The genre of the event may be used by the recommendation engine 312 to generate one or more rules to further guide a recommendation process according to embodiments of the present disclosure.

The venue database 314 may describe physical locations of the different seats of the venue, as well as one or more interrelationships between the seats. These interrelationships may include a rating of all other seats relative to each given seat in terms of distance from the seat (e.g., number of seats laterally away on the same row, number of rows ahead or behind the given seat, the section in which the seat is found, etc.), a differential in price of each seat from every other seat, or other metrics. The venue database 314 may also include specific information pertaining to the event occurring at a given time. For example, where the event is a sporting event with two opposing teams, the venue database 314 may additionally include which side each time is on. These interrelationships expressed by the venue database 314 may be used to automatically compare tickets and provide one or more substitute ticket recommendations according to embodiments of the present disclosure.

The process modeling server 302 also includes recommendation engine 312. The recommendation engine 312 includes one or more rules, for example a set of rules. The recommendation engine 312 generates the set of rules based on information obtained from the venue data 314 and/or any other information source, such as the input device 304 as discussed below. The recommendation engine 312 may generate the set of rules as a static set of rules that is generated prior to performing any ticket comparisons or recommending any substitutes. For example, the recommendation engine 312 may create the set of rules when the recommendation engine 312 is created, for example by input from the input device 304, and then statically maintained through one or more comparisons and/or recommendations until changed from input/command by the input device 304.

Alternatively, the recommendation engine 312 may generate the set of rules dynamically prior to comparison and recommendation based on one or more attributes specific to the occurrence causing the call to the recommendation engine 312. For example, where the occurrence is the cancellation of a ticket, the cancellation of the ticket (e.g., received as a notification at the process modeling server 302) may trigger the recommendation engine 312 to pull information specific to the event the cancelled ticket was for from the venue database 314 and, together with information specifically about the cancelled ticket and/or ticket holder customer information pulled from the customer database 306, dynamically generate the set of rules that will be used to compare tickets and recommend one or more substitutes.

The input device 304 is a device that is used to create, train, and/or revise the recommendation engine 312. The input device 304 may be implemented using any appropriate combination of hardware and/or software configured for wired and/or wireless communication over network 310. For example, in one embodiment, the input device 304 may be implemented as a personal computer in communication with the Internet. In other embodiments, the input device 304 may be a smart phone, personal digital assistant (PDA), laptop computer, server, and/or other types of computing devices. In an embodiment, the input device 304 may interact with the process modeling server 302, and the recommendation 312 in particular, via a web interface provided by the process modeling server 302. The input device 304 may be operated by a specially trained user capable of guiding rule set creation and comparison/recommendation methodology so as to properly guide the process. Although described as one device, those skilled in the relevant art(s) will recognize that the input device 304 may represent multiple devices used by multiple users to interact with the process modeling server 302. The input device 304 may be used later to compare one or more recommendations created by the recommendation engine 312 to what a customer actually selected, and refine either the criteria used to generate the rule set or refine the rule set itself. Alternatively, the recommendation engine 312 may compare the recommendations with actual selections to automatically refine the rule set.

The customer database 306 may include customer data such as, for example, customer account information indicating customers who have purchased tickets to an event, seats assigned to customers, and/or any other customer information known in the art. For example, the customer database 306 may maintain a purchasing history for customers according to their registered profile. Further, the customer database 306 may maintain customer profiles, for example based on information the customers volunteer during registration or afterward. Such information may include, for example, generic preferences for seating location (e.g., lower half of rows in venue, particular section(s) in venues of different genres, ticket usage habits such as resell or use, etc), a preferred range of ticket prices per seat type, group preferences, etc. This information regarding specific customers may be useful to the recommendation engine 312 in order to either further refine the set of rules used for ticket comparison/recommendation or to include with the cancelled ticket attributes compared against the set of rules. The customer database 306 may be maintained separate from the process modeling server 302, for example by a separate server (such as the online marketplace provider device 208 of FIG. 2), or alternatively may be implemented/maintained as part of the process modeling server 302, to name a few examples.

In operation, aspects of the process modeling server 302 are first built and trained, and later refined. For example, at an initial point in time, such as at first initialization, the venue database 314 is constructed. This may include the generation of one or more genres for events/venues as well as integration/digitization of seat maps and other information about the venues. In an embodiment, some or all of this information may be received via input from the input device 304. Alternatively, the information may be received via transfer from another process modeling server. With this information, the recommendation engine 312 may be built. For example, a user of the input device 304 may specify what information from the venue database 314 to include in generation of the rule set used by the recommendation engine 312, such as via a web interface at the input device 304.

Figure 4:
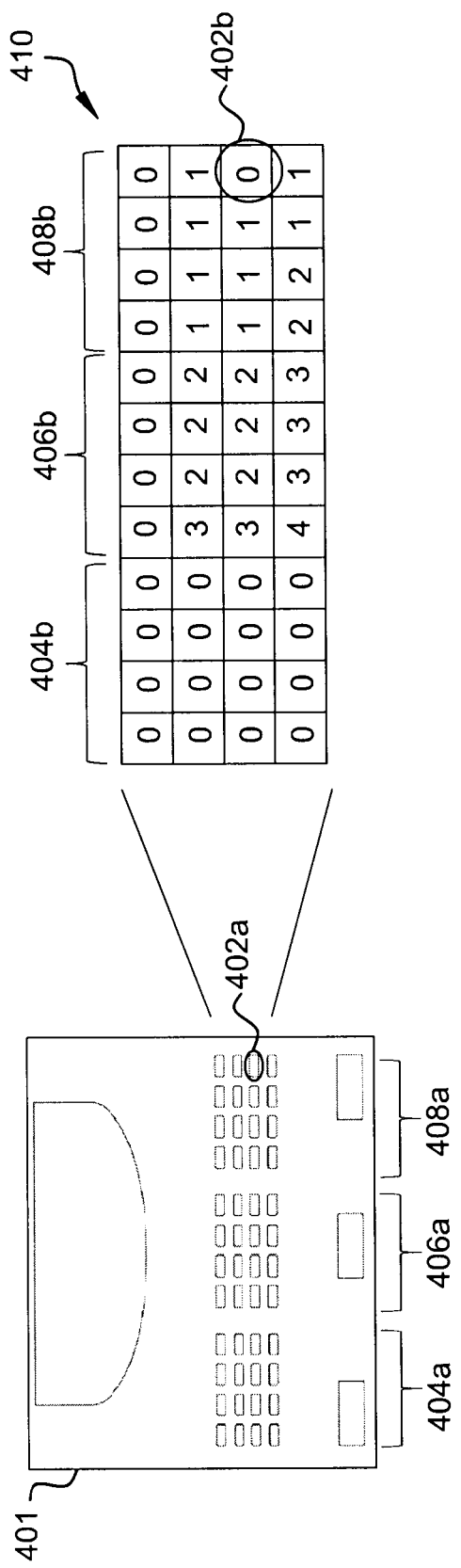
FIG. 4 is a schematic view of a visualization of a conversion of a seat map to a proximity matrix.

The creation of a proximity matrix from a seat map for a given venue may also be guided by input from a user of the input device 304. FIG. 4 illustrates a visualization of a conversion of a seat map to a proximity matrix according to embodiments of the present disclosure. As shown in FIG. 4, a seat map 401 of a venue 100 includes three sections 404a, 406a, and 408a with a plurality of seats 402. As will be recognized, this is exemplary only for simplicity of discussion. Other seat maps may include more or fewer rows and/or sections without departing from the scope of the present disclosure. The seat map 401 is converted by the process modeling server 302 into a proximity matrix 410.

This process will be described with respect to exemplary seat 402a, which as shown in FIG. 4 is in the third section 408a of the seat map 401. The process modeling server 302 generates the proximity matrix 410 by first generating as many columns and rows as there are in the seat map 401. As a result, each seat 402 in the seat map 401 corresponds to one entry in the proximity matrix 410. The process modeling server 302 then populates each element in the proximity matrix 410 with a value that signifies a proximity to the exemplary seat 402a.

As illustrated, the process modeling server 302 assigns a zero value to the matrix element 402b corresponding to the exemplary seat 402a's location in the seat map 401. A value of 1 may be assigned to those seats on the same row of the exemplary seat 402a in the third matrix block 408b corresponding to the third section 408a, signifying a high desirability for those seats. A value of 2 may be assigned to those seats in the third matrix block 408b which are less desirable, e.g. because they are not on the same row and more seats away from the location of the exemplary seat 402a. Elements in the second matrix block 406b may receive higher values, signifying less desirability for those seats as their proximity to the exemplary seat 402a decreases. A value of 0 may be assigned to those seats in any of the matrix blocks which are not desirable at all based either on proximity (specifically, lack thereof) to the exemplary seat 402a, a preset rule, a customer preference identified in the customer database 306, or some other factor. As illustrated, none of the seats corresponding to the elements in the first matrix block 404b are desirable, for example because they are too far away from a desired location vis-a-vis the stage 102 (FIG. 1). The use of numerical values, as well as the weight given to large or small values, is by example only. As will be recognized, in an alternative small numbers may reflect low proximity and larger values close proximity to the exemplary seat 402a. Further, instead of numerical values other indicia may be included, such as plus (+) or minus (−) signs to indicate close or distant proximity.

The above process may be repeated for all of the seats of the seat map 401, thereby ranking the seats relative to each other in a plurality of proximity matrices 410. The ranking may be accomplished by inputting information for each section, row, and/or seat in the seat map 401 into the respective proximity matrix 410. This information may be input by the user of the input device 304 without additional help. Alternatively, the process modeling server 302 may automatically generate the information for each seat 402 based on data provided to the process modeling server 302 regarding the given venue. The automatically generated information may be used as generated or may be refined by input from the user of the input device 304. The ranking may be customer-specific, such that the rankings may differ for different customers having different profiles or associated information.

Returning to FIG. 3, together with the generated proximity matrix additional information may be included to specify other attributes that should be considered when comparing tickets. For example, the user at the input device 304 may further specify that the set of rules include more criteria beyond the relational information that may have an impact on automatically determining levels of equivalence for different substitution options. This may include the entry of the additional information and/or specifying that those additional attributes should be part of the rule set so they are compared in use.

After the desired information has been included for generation of the rule set for a given venue, the rule set is generated for the recommendation engine 312. When a comparison and recommendation for a given venue arises, the recommendation engine 312 accesses the relevant rule set for the given venue, for example from the venue database 314, and compares one or more attributes of the unavailable ticket to available tickets using the rule set. In an embodiment, the recommendation engine 312 may modify the rule set with one or more customer-specific attributes or preferences to produce a personalized rule set for the comparison. For example, customer-specific attributes may include customer purchase/sale patterns (e.g., likelihood that the customer purchased the unavailable ticket to flip it for a desired profit) or an estimated desirability of attending the particular event (e.g., as based on customer calendar information provided or obtained, social postings of the customer provided or obtained, customer travel information provided or obtained, and/or profile data regarding the customer's preferences for the venue and/or event). The recommendation engine 312 takes the results of the comparison and generates one or more substitute ticket alternatives. The substitute ticket alternatives may include, for example, one or more alternative tickets that have a high level of proximity, and/or price comparability, to the unavailable ticket. In another embodiment, the substitute ticket alternatives may include alternatives that have different location and/or price attributes (e.g., more expensive seats where the recommendation engine 312 determines that the customer has high desirability to attend the specific event, as determined from customer-specific attributes), either together with more "comparable" tickets (similar price/location attributes) or without.

In addition to generating one or more substitute ticket alternatives, the recommendation engine 312 may compute a confidence level for each generated alternative. The confidence level represents a prediction of how confident the system is that the customer will select any given alternative. For example, where the recommendation engine 312 generates three substitute ticket alternatives, the recommendation engine 312 may compute a confidence level (e.g., a percentage) for each—e.g., alternative 1 may have a 80 percent confidence level, alternative 2 may have a 97 percent confidence level, and alternative 3 may have a 40 percent confidence level. These confidence levels may be computed based on past history of the customer, for example as provided by the customer database 306. Alternatively, the confidence level may be computed based on an estimation from the rule set that may be refined over time.

The substitute ticket alternatives may be provided as a recommendation to one or more devices. In an embodiment, the substitute ticket alternatives are provided to a customer service representative either automatically or in response to a request from the customer service representative. In another embodiment, the substitute ticket alternatives are provided to the customer whose ticket became unavailable, for example by sending a message directly to the customer (e.g., via email or text message) or by placing the substitute ticket alternatives in the customer's online account. The customer may then access their account, for example via a web interface or mobile app, and select one of the alternatives. In yet another embodiment, the recommendation engine 312 may automatically select and accept one of the generated alternatives based on the selected alternative having a confidence level above a pre-determined threshold, such as 95 percent as one example. The recommendation engine 312 then notifies the customer of the selected and accepted substitute ticket.

According to an embodiment, the recommendation engine 312 may follow a tiered approach with the above embodiments: for a given comparison/recommendation, the recommendation engine 312 may first check whether any alternative has a confidence level above the pre-determined threshold. If so, the recommendation engine 312 may accept the alternative exceeding the threshold. If not, the recommendation engine 312 may send the alternatives to the customer for selection. The recommendation 312 may send all of the alternatives to the customer, or alternatively may send only a subset if there are more than a pre-set amount, e.g. three (though other values are possible as will be recognized). In an embodiment, those with the highest confidence levels may be included in the list of alternatives sent to the customer. If all of the generated alternatives fall below another predefined confidence level threshold (e.g. 40 percent or less), or the recommendation engine 312 is unable to generate any alternatives that meet the requirements imposed by the rule set, the recommendation system 312 may instead notify a customer service representative for manual review/interaction with the customer.

In embodiments where the customer is given the possibility of choosing from among a list of generated alternatives, the customer's choice may be recorded by the process modeling server 302 for further refinement. For example, the process modeling server 302 may compare the customer's actual selection with the confidence levels calculated for each alternative. Based on this comparison the process modeling server 302, for example by way of the recommendation engine 312, may update the weights assigned to each factor that contributes to the calculation of the confidence levels, for example by increasing or decreasing the weights.

Figure 5:
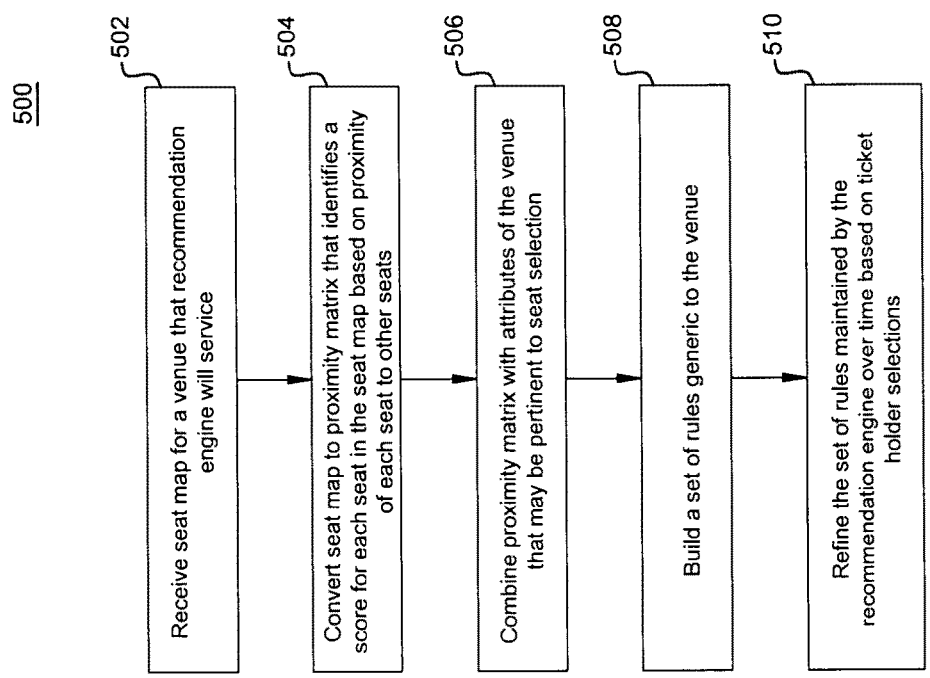
FIG. 5 is a flow diagram illustrating an embodiment of a method for generating a recommendation engine.

FIG. 5 is a flow diagram illustrating an embodiment of a method 500 for generating a recommendation engine. In an embodiment, the method 500 may be performed by a process modeling device such as, for example, the process modeling server 302 that has recommendation engine 312 in FIG. 3. In an embodiment, the process modeling device may be operated by an online marketplace provider such as, for example, StubHub, a subsidiary of EBay, Inc. of San Jose, Calif. that provides an online marketplace for venues, events, customers, and other entities that allow transactions between those entities.

The method 500 begins at step 502, where the process modeling device receives a seat map for a venue that will be serviced by the recommendation engine of the process modeling device. In an embodiment, the seat map may include a listing of seats. In an alternative embodiment, the seat map may include proximity information of each seat in relation to other seats pre-programmed into it.

At step 504, the process modeling device converts the seat map received at step 502 into a proximity matrix, for example as illustrated in FIG. 4 and discussed above. The proximity matrix may provide a metric that identifies a desirability of other seats in relation to a given seat. For example, the proximity matrix may include a plurality of matrices, one generated for each seat (e.g., with a total number of matrices equaling the total number of seats available in the venue). In this example, a given element in the matrix, corresponding to a given seat in the seat map, may show a score for each seat in the seat map relative to the given seat based on proximity to the given seat. The score may be a numerical score or a positive/negative score, to name a few examples. The proximity matrix may additionally be weighted by other considerations, such as ticket price and general location within the venue.

At step 506, with the proximity matrix created, the process modeling device combines the proximity matrix (or matrices, depending upon how generated) with one or more additional attributes of the venue that may be pertinent to selection of seats. For example, the attributes may include criteria that may have an impact on the automatic determination of equivalence by the process modeling device. Some examples include whether the seat is wheelchair accessible, the section in which the seat is located, the type of seat, desirable locations of seats (e.g., team's side, at a particular location vis-à-vis the stage/field of the venue, etc.).

At step 508, the process modeling device builds a set of rules generic to the venue. The set of rules may include one or more rules against which the attributes of a given ticket are compared by the process modeling device. For example, when a comparison is made, the process modeling device may extract from the given ticket, or receive from another source, the attributes of the given ticket (such as seat location, price, type of ticket (e.g. general admission or otherwise), special characteristics (e.g. wheelchair accessible or granting of specific perks), etc.) for comparison against the one or more rules in the set of rules.

At step 510, after the process modeling device uses the set of rules in comparisons with tickets, such as cancelled tickets, the process modeling device refines the set of rules based on customer action with respect to any substitute alternatives generated from the comparison with the set of rules. The refinement of the set of rules may occur one time, or periodically as requested or according to pre-set intervals. The process modeling device may refine the set of rules based on comparing the confidence level assigned to any generated alternative with the selection actually made by the customer between alternatives. This may occur even in situations where the process modeling device assigned a high enough confidence level to a given alternative that it selected the alternative on behalf of the customer. Whenever the selection is automatically made and accepted on behalf of the customer, the message to the customer may also provide an option to reverse the acceptance and/or talk with a representative. Any changes by the customer may be tracked. Further, a message to the customer regarding alternative selection may include one or more survey questions that may provide information regarding what is important for the given customer, which in an embodiment may be generalized to customers generally. Alternatively, the responses to the survey questions may be stored in a customer database specifically related to the given customer, and pulled when a substitution has to be made again in the future for one or more tickets associated with the customer's account maintained by the customer database.

In an embodiment, comparing the customer's actual selection to the confidence levels assigned to each alternative may result in assigning different weights to the different rules in the set of rules. Where the set of rules was initially created without weights to any of the rules in the set, the process modeling device may assign an initial weight to each rule and modify the weights over time in order to arrive at confidence level calculations that better track actual customer decisions. Alternatively, the comparison may trigger a flag notifying a party, such as an expert at the input device 304 of FIG. 3, that one or more rules in the rule set should be removed, changed, or one or more new rules added.

The steps of method 500 may be repeated for each seat map received at the process modeling device for one or more genres. In an embodiment, the proximity matrix generated/maintained by the process modeling device may be used in reverse to create a seat map.

Figure 6:
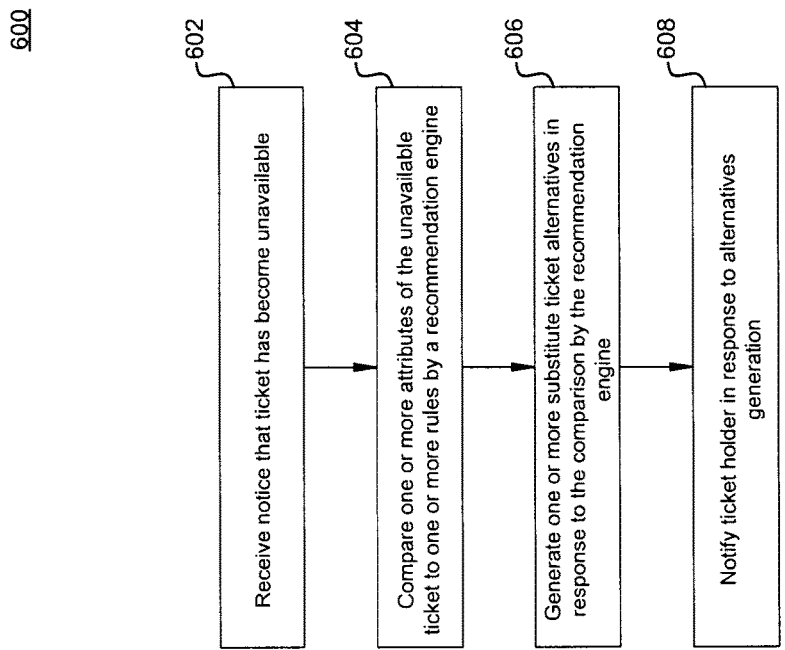
FIG. 6 is a flow diagram illustrating an embodiment of a method for comparing tickets and providing recommended substitutions.

Referring now to FIG. 6, an embodiment of a method 600 for comparing tickets and providing recommended substitutions is illustrated. In an embodiment, the method 600 may be performed by a process modeling device such as, for example, the process modeling server 302 that has recommendation engine 312 in FIG. 3.

At step 602, the process modeling device receives a notification that a ticket has been cancelled or otherwise become unavailable from the ticket seller/provider. This may occur, for example, where the seller of the ticket pulls the ticket from availability, whether before or after a sale to a potential customer or customer (buyer). Alternatively, this may occur where a potential customer has marked a particular ticket for possible purchase, which ticket becomes unavailable before completing the purchase.

At step 604, the process modeling device compares one or more attributes of the now-unavailable ticket to one or more rules by a recommendation engine of the process modeling device. The recommendation engine may do so by accessing the relevant rule set for the given venue and comparing one or more attributes of the unavailable ticket to available tickets using the rule set.

In an embodiment, the relevant rule set may include, or may be modified by, one or more customer-specific preferences. These customer-specific preferences may be accessed from the customer database 306, for example. The customer-specific preferences may include customer purchase/selling history (e.g., the customer typically buys a ticket and turns around and sells it, or "flips" it, the event is at a location that is distant from the customer's normal event attendance/place of residence, the event does not relate to a type of event (or genre) that the customer typically attends or shows interest in, to name just a few examples).

At step 606, as a result of the comparison at step 604, the process modeling device generates one or more substitute ticket alternatives. For example, the recommendation engine may generate one or more substitute ticket alternatives based on the comparison. The recommendation engine may also generate a confidence level associated with each substitute ticket alternative, which represents a prediction of how confident the recommendation engine is that the customer will select any given alternative.

At step 608, the process modeling device sends a notice to the customer/potential customer in response to the generation of the one or more substitute ticket alternatives. For example, the process modeling device may accept an alternative based on a high confidence level and notify the customer of the acceptance, send a full or partial list of the alternatives to the customer for the customer to make a selection, or present the alternatives to a customer service representative to discuss and/or select with the customer.

Figure 7:
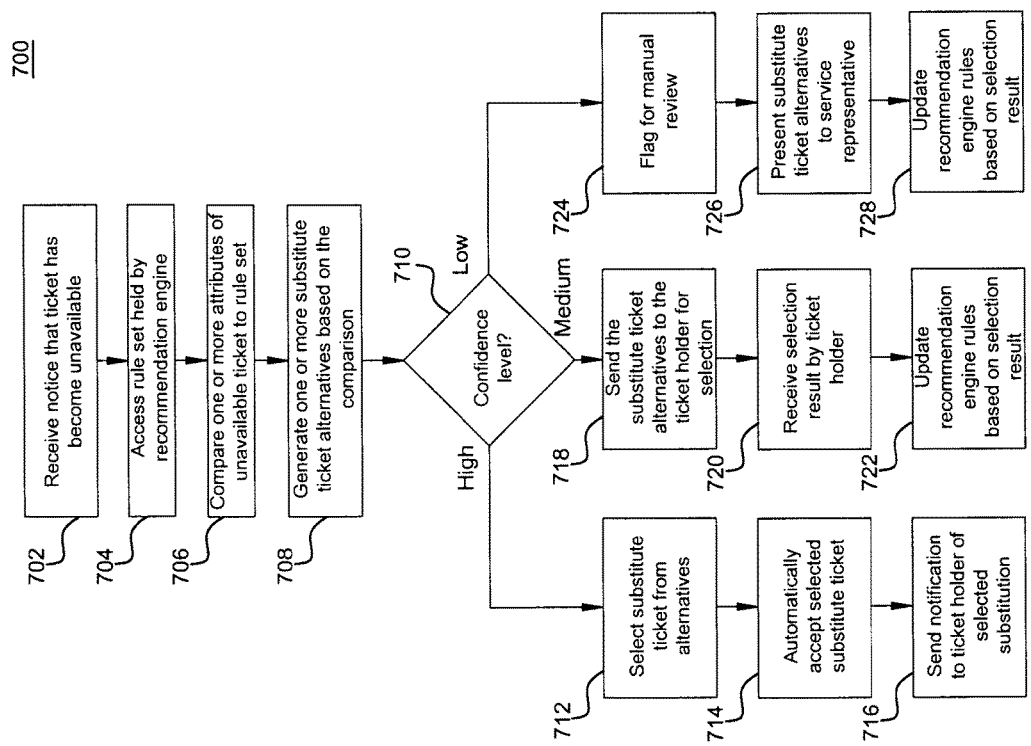
FIG. 7 is a flow diagram illustrating an embodiment of a method for comparing tickets and providing recommended substitutions.

FIG. 7 is a flow diagram illustrating an embodiment of a method 700 for comparing tickets and providing recommended substitutions. In an embodiment, the method 700 may be performed by a process modeling device such as, for example, the process modeling server 302 that has recommendation engine 312 in FIG. 3.

At step 702, the process modeling device receives notice that a ticket has become unavailable, such as cancelled, for example as described in embodiments above. Together with or after receiving this notice, the process modeling device may also receive one or more attributes associated with the unavailable ticket. In an embodiment, the attribute information may be sent with the notice. In another embodiment, the process modeling device may request attribute information in response to receipt of the unavailability notice.

At step 704, the process modeling device accesses the rule set maintained for the particular venue associated with the unavailable ticket. In an embodiment, the rule set is stored in the venue database 314 of the process modeling server 302 as shown in FIG. 3, or alternatively with the recommendation engine 312. In another embodiment, the rule set may be stored in a database external to the process modeling device. Additionally, the process modeling device may access one or more attributes associated with the customer in particular (e.g., where the customer maintains a profile with the online marketplace provider that is kept with the customer database) to further narrow possible substitute tickets.

At step 706, the process modeling device compares one or more attributes associated with the unavailable ticket with the rule set accessed at step 704. The process modeling device may compare by accessing the relevant rule set for the given venue (and, in embodiments, additional customer-specific preferences) and comparing one or more attributes of the unavailable ticket to available tickets using the rule set.

At step 708, as a result of the comparing at step 706, one or more substitute ticket alternatives are generated. For example, the comparing at step 706 may identify one or more tickets as possible equivalents. Determination of equivalency may be based on various aspects discussed above, such as seat proximity, price proximity, and other such characteristics. In an additional or alternative embodiment, the determination may be customer-specific. For example, information obtained for the specific customer from the customer database 306 may indicate that the customer typically flips tickets that the customer purchases, or that the unavailable ticket is not likely something the customer wanted to attend (e.g., at a distant location, not an event the customer typically attends or shows interest in, etc.) according to an analysis and decision by the process modeling device. In this situation, the process modeling device may recommend one or more "good value" tickets as alternatives, e.g. ticket alternatives that the customer may more easily flip for a profit.

In another alternative embodiment, the unavailable ticket may be for an event the customer really wants to attend. The process modeling device may ascertain the desirability of attendance based on information obtained from the customer's profile maintained by the customer database 306, or by information provided from the customer directly, or received with the notice of unavailability. This information may come in the form of the customer's calendar (e.g., either provided by the customer, accessed by the device with consent of the customer, or maintained by the device), from social postings (e.g., either provided by the customer, accessed by the device with consent of the customer, or maintained by the device), customer travel information (e.g., plane ticket(s) and/or hotel reservation(s) for the city where the event of the unavailable ticket is located, either provided by the customer to the device or accessed by the device with the customer's prior or current consent), profile data maintained by the database or provided directly from the customer regarding the customer's preferences for the event or person/team at the event, or other information that indicates that the customer is going with a group or for a special occasion.

Where the process modeling device has access to ascertain an estimated desirability of the customer to attend the event, then the process modeling device may generate the substitute ticket alternatives at higher price points/better physical locations. In one embodiment, the process modeling device may include such ticket types (higher price, better location) at no additional cost to the customer. In another embodiment, the process modeling device includes the higher priced and/or better located ticket alternatives as an upsell offer to the customer, so that the customer may choose to spend more for the better ticket type or not. In this way, the substitute ticket alternatives may be more customer-specific and based at least in part on a determined customer interest in attending the event instead of just buying the ticket.

The process modeling device also generates a confidence level associated with each substitute ticket alternative, which represents a prediction of how confident the process modeling device is that the customer will select any given alternative. The confidence level for each alternative may be generated based on one or more weights associated with one or more of the rules in the rule set that the unavailable ticket's attributes are compared against.

At decision step 710, the process modeling device analyzes the confidence level of each substitute ticket alternative. If the confidence level of one of the alternatives is "high," e.g. above a first threshold, then the method 700 proceeds to step 712. In an embodiment, the first threshold may be 95 percent confidence of customer acceptance of the given alternative, to name just one example. If the confidence level is "medium," e.g. below the first threshold but above a second threshold, then the method proceeds to step 718. In an embodiment, the second threshold may be 40 percent to name an example. If the confidence level is "low," e.g. below the second threshold, then the method proceeds to step 724. As will be recognized, the first and second thresholds may be set to be any value from among a range to reflect user preferences for each of the high, medium, and low confidence level designations.

If the confidence level for at least one substitute ticket alternative is "high," then the method proceeds to step 712. At step 712, the process modeling device, for example the recommendation engine 312 of FIG. 3, selects a substitute ticket from among the list of alternatives with the highest confidence level above the first threshold.

After selecting the substitute ticket with the highest confidence level, the method 700 proceeds to step 714, where the recommendation engine 312 automatically accepts the selected substitute ticket on behalf of the customer.

At step 716, the process modeling device sends a notification to the customer of the selected and accepted ticket substitution. In an embodiment, the notification may be in the form of a text message, an email, or other type of message including the selected substitute ticket. Alternatively, the message may be a notification directing the customer to check their account at a web interface to receive the notice and ticket details, to name just a few examples.

Returning to decision step 710, if none of the substitute ticket alternatives has a confidence level above the first threshold, but one or more of the substitute ticket alternatives' confidence levels are above the second threshold, then the method 700 proceeds to step 718.

At step 718, the process modeling device notifies the customer of the one or more substitute ticket alternatives so that the customer may select from among the alternatives. In an embodiment where there are a large amount of possible alternatives (e.g. dozens or more), the process modeling device may first narrow down the list. For example, the process modeling device may filter the list by confidence level, presenting only a subset with a confidence level above a third threshold that is greater than the second threshold. The third threshold may statically set beforehand. Alternatively, the third threshold may be set each time dynamically by identifying x number of alternatives with the highest confidence levels and setting threshold right below that number so that only those x number of alternatives are presented to the customer. In an embodiment, the process modeling device may identify the top three alternatives and cut off the rest.

In an embodiment, the process modeling device may notify the customer by sending an email or text message, as just a couple examples. The message may include the list of alternatives and a way to select between them, such as hyperlinks or radio buttons, to name a couple examples. Alternatively, a message may simply notify the customer to check their account at a web interface to review the alternatives and make a selection.

At step 720, the process modeling device receives the selection result in response to the customer making a selection from among the alternatives. The process modeling device may then process the selection by accepting it and sending the substitute ticket information to the customer as described above.

At step 722, in response to receiving the selection, the process modeling device may update the recommendation engine, such as the rules generated, based on the selection result. This may be done, for example, as described above with respect to FIG. 5.

Returning to decision step 710, if none of the substitute ticket alternatives has a confidence level below the second threshold, then the method 700 proceeds to step 724.

At step 724, the process modeling device flags the situation for manual review, for example by a customer service representative of the online marketplace provider that is operating the process modeling device.

At step 726, the process modeling device presents the substitute ticket alternatives generated at step 708 to a customer service representative (CSR). In an embodiment, the alternatives may be presented via an email to the CSR so that the CSR may reach out to the customer to assist in deciding how to substitute for the unavailable ticket. Alternatively, the list may be presented to the CSR upon request during a call from the customer.

In an embodiment, this may be expanded to accommodate situations where there are no alternatives, or no viable alternatives, for the specific event at the venue. Embodiments of the present disclosure may also be used to automatically compare attributes of the unavailable ticket to other tickets at the same venue or different venues to identify a list of possible equivalent alternatives, for example equivalent in terms of price, location, and/or type of event.

At step 728, after receiving a ticket selection (or other type of decision, such as for an alternative venue/event) from the CSR, the process modeling device updates one or more rules of the recommendation engine of the process modeling device based on the selection result. This may be done, for example, as described above with respect to FIG. 5.

Figure 8:
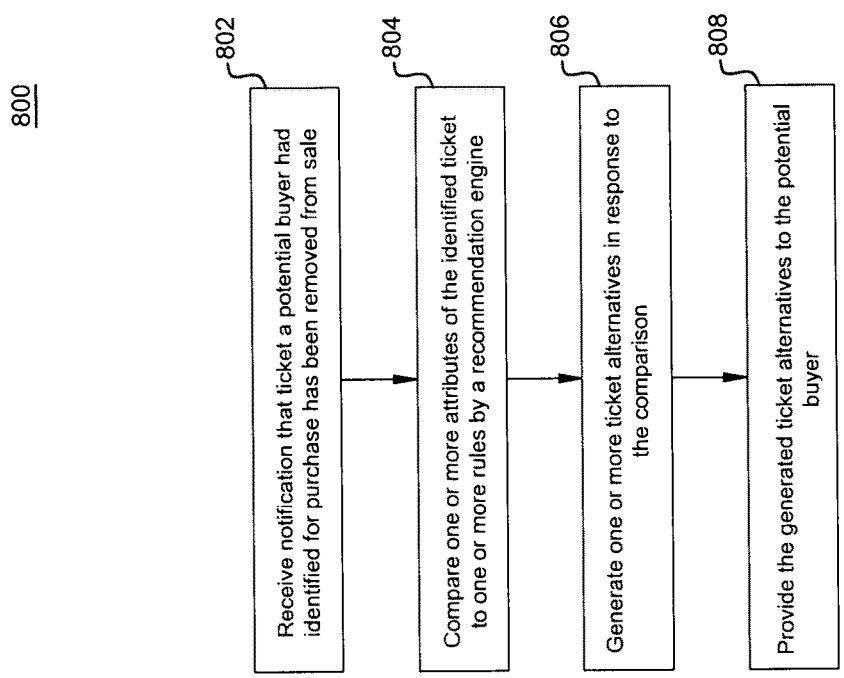
FIG. 8 is a flow diagram illustrating an embodiment of a method for comparing tickets and providing recommended substitutions.

FIG. 8 is a flow diagram illustrating an embodiment of a method 800 for comparing tickets and providing recommended substitutions. In an embodiment, the method 800 may be performed by a process modeling device such as, for example, the process modeling server 302 that has recommendation engine 312 in FIG. 3. The method 800 may be an alternative embodiment to the method 700 described above applicable in scenarios where a customer has not purchased a ticket yet, but rather has identified one or more tickets as potential purchases.

At step 802, the process modeling device receives a notification that the one or more tickets identified as potential purchases have been removed from sale. This may occur, for example, where someone else purchased the ticket while the customer was browsing/deliberating, or where the provider of the ticket otherwise pulls the ticket.

At step 804, the process modeling device compares one or more attributes of the identified ticket to one or more rules by a recommendation engine of the process modeling device, for example as described with respect to the methods above.

At step 806, the process modeling device generates one or more ticket alternatives in response to the comparing from step 804. The ticket alternatives may be generated according to one or more of the embodiments described above.

At step 808, the process modeling device presents the ticket alternatives to the customer. In an embodiment, the process modeling device may present the alternatives through the online marketplace provider in the same session in which the customer had initially identified the now-unavailable ticket(s). In this manner, the method 800 may be used to assist in providing automatic alternatives to customers where tickets identified to be of interest become unavailable.

Figure 9:
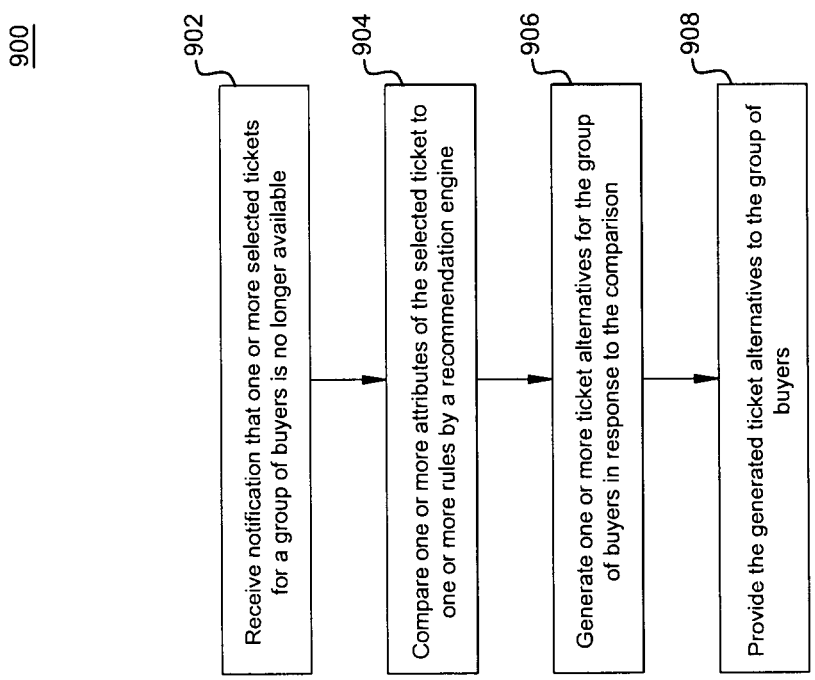
FIG. 9 is a flow diagram illustrating an embodiment of a method for comparing tickets and providing recommended substitutions.

FIG. 9 is a flow diagram illustrating an embodiment of a method 900 for comparing tickets and providing recommended substitutions. In an embodiment, the method 900 may be performed by a process modeling device such as, for example, the process modeling server 302 that has recommendation engine 312 in FIG. 3. The method 900 may be an alternative embodiment to the method 700 described above applicable in social scenarios where a customer is planning to attend an event with a group of buyers, e.g. friends.

At step 902, the process modeling device receives a notification that one or more of the tickets of members of the group is no longer available, such as cancelled. This could include just one ticket for just one customer from among the group of buyers, some subset of the buyers, or all of the buyers. The process modeling device may receive the notification according to one or more of the embodiments discussed above, for example.

At step 904, the process modeling device compares one or more attributes of the unavailable ticket to one or more rules. This may be performed, for example, according to one or more of the embodiments described above.

At step 906, the process modeling device generates one or more ticket alternatives in response to the comparing from step 904. The ticket alternatives may be generated according to one or more of the embodiments described above. In an embodiment, the ticket alternatives are generated for each identified member of the group of buyers, so that the group may still be able to attend the event together should they so choose. If, however, one of the buyers with a ticket that did not become unavailable does not desire a substitute ticket, that buyer(s) may back out from the group and maintain their original ticket(s).

At step 908, the process modeling device provides the generated ticket alternatives to the group of buyers. In an embodiment, even where the confidence level associated with a given ticket is sufficiently high to warrant automatic acceptance according to other embodiments of the present disclosure, the process modeling device may still provide the recommendation to the buyer(s) in order to provide them the option to stay with the identified group or not. In another alternative embodiment, if the confidence level for any one or more of the ticket alternatives for the group of buyers exceeds the high threshold, the process modeling device may accept the ticket alternatives with the highest confidence level for each buyer in the group, so that the group is maintained and steered by the ticket(s) with the highest confidence level(s).

In this manner, the process modeling device may provide automatic comparisons and recommendations to groups of buyers that desire to attend an event together where one or more of the tickets associated with the group become unavailable.

Figure 10:
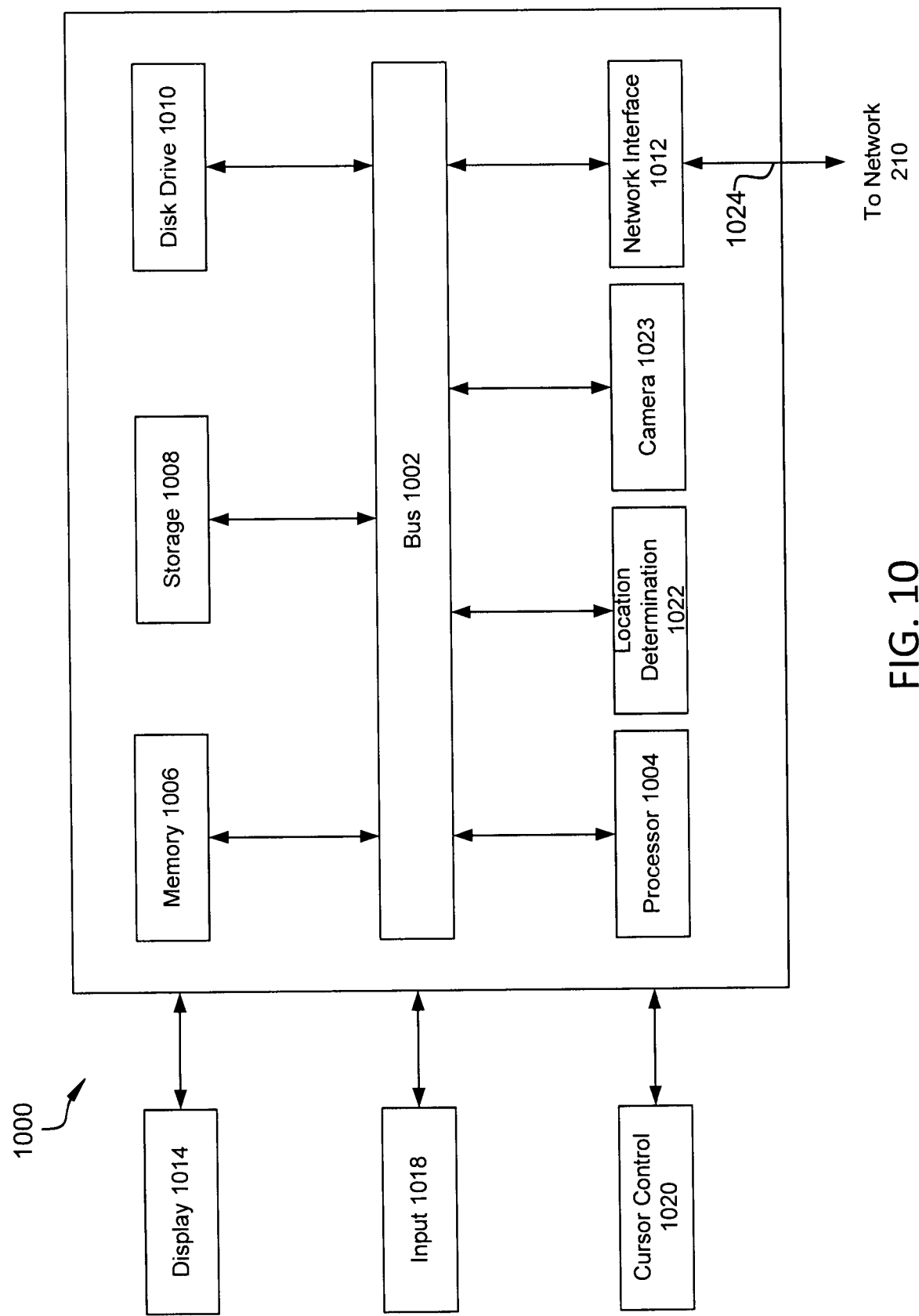
FIG. 10 is a schematic view illustrating an embodiment of a computer system.

Referring now to FIG. 10, an embodiment of a computer system 1000 suitable for implementing, for example, the customer devices, venue operator device, payment service provider device, online marketplace provider device, and/or process modeling device, is illustrated. It should be appreciated that other devices utilized by customers, venue operators, payment service providers, online marketplace providers, and/or process modelers in the system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the customer devices, merchant devices, payment service provider device, and/or process modeling device. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 210 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   at least one computer-readable media storing instructions; and
   one or more hardware processors coupled to the at least one computer-readable media and configured to execute the instructions to cause the system to perform operations, the operations comprising:
   obtain a notification that a ticket of a ticket holder for a first seat to an event at a venue is not available;
   generate a proximity matrix based on a seat map of a venue that identifies a proximity score for each seat in the seat map based on a proximity of each seat to the first seat that is not available;
   generate one or more rules based on the proximity matrix and an attribute of the venue;

receive a purchasing history of a ticket holder from a database of an on-line marketplace;
compare one or more attributes of the unavailable ticket to the one or more rules and to the purchasing history;
in response to obtaining the notification and performing the comparison, determine a one or more substitute tickets for second seats to the event in the venue based on one or more attributes of the first seat, one or more attributes of the second seats, and information from the proximity matrix with respect to the first seat;
obtain a confidence level for each of the one or more substitute tickets based on a likelihood of the ticket holder to accept each of the one or more substitute tickets; and
in response to one of the one or more substitute tickets having a confidence level that does not satisfy a threshold, direct the one or more substitute tickets to the ticket holder.

2. The system of claim 1, wherein in response to all of the one or more substitute tickets having a confidence level that does not satisfy the threshold, the one or more substitute tickets is directed to the ticket holder instead of the system automatically accepting one of the one or more substitute tickets that have a confidence level that satisfies the threshold.

3. The system of claim 1, wherein the one or more substitute tickets are further determined based on the purchasing history of the ticket holder.

4. The system of claim 1, wherein the operations further comprise:
obtain a selection by the ticket holder of the one or more substitute tickets; and
update the purchase history of the ticket holder based on the selection by the ticket holder.

5. The system of claim 1, wherein the one or more substitute tickets to the event are determined using the one or more rules.

6. The system of claim 1, wherein the operations further comprise adapt the one or more rules based on an event genre of the event, wherein the one or more substitute tickets to the event are determined using the one or more rules as adapted.

7. The system of claim 1, wherein the operations further comprise compute the confidence level for each of the one or more substitute tickets based on an estimation from a personalized rule set associated with event preferences of the ticket holder.

8. A method performed on a server, comprising:
obtaining a notification that a ticket of a ticket holder for a first seat to an event at a venue is not available;
generating a proximity matrix on the server based on a seat map of a venue that identifies a proximity score for each seat in the seat map based on a proximity of each seat to the first seat that is not available;
generating one or more rules based on the proximity matrix and an attribute of the venue;
receiving a purchasing history of a ticket holder from a database of an on-line marketplace;
comparing one or more attributes of the unavailable ticket to the one or more rules and to the purchasing history;
in response to obtaining the notification and performing the comparison, determining, on the server, a one or more substitute tickets for second seats to the event in the venue based on one or more attributes of the first seat, one or more attributes of the second seats, and information from the proximity matrix with respect to the first seat;
obtaining a confidence level for each of the one or more substitute tickets based on a likelihood of the ticket holder to accept each of the one or more substitute tickets; and
in response to one of the one or more substitute tickets having a confidence level that does not satisfy a threshold, directing the one or more substitute tickets to the ticket holder.

9. The method of claim 8, wherein in response to all of the one or more substitute tickets having a confidence level that does not satisfy the threshold, the one or more substitute tickets is directed to the ticket holder instead of automatically accepting one of the one or more substitute tickets that have a confidence level that satisfies the threshold.

10. The method of claim 8, wherein the one or more substitute tickets are further determined based on the purchasing history of the ticket holder.

11. The method of claim 8, further comprising:
obtaining a selection by the ticket holder of the one or more substitute tickets; and
updating the purchase history of the ticket holder based on the selection by the ticket holder.

12. The method of claim 8, wherein the one or more substitute tickets to the event are determined using the one or more rules.

13. The method of claim 8, further comprising adapting the one or more rules based on an event genre of the event, wherein the one or more substitute tickets to the event are determined using the one or more rules as adapted.

14. The method of claim 8, further comprising computing the confidence level for each of the one or more substitute tickets based on an estimation from a personalized rule set associated with event preferences of the ticket holder.

15. A non-transitory, computer-readable medium, configured to store instructions that when executed by a system cause the system to perform operations, the operations comprising:
obtain a notification that a ticket of a ticket holder for a first seat to an event at a venue is not available;
generate a proximity matrix based on a seat map of a venue that identifies a proximity score for each seat in the seat map based on a proximity of each seat to the first seat that is not available;
generate one or more rules based on the proximity matrix and an attribute of the venue;
receive a purchasing history of a ticket holder from a database of an on-line marketplace;
compare one or more attributes of the unavailable ticket to the one or more rules and to the purchasing history;
in response to obtaining the notification and performing the comparison, determine a one or more substitute tickets for second seats to the event in the venue based on one or more attributes of the first seat, one or more attributes of the second seats, and information from the proximity matrix with respect to the first seat;
obtain a confidence level for each of the one or more substitute tickets based on a likelihood of the ticket holder to accept each of the one or more substitute tickets; and
in response to one of the one or more substitute tickets having a confidence level that does not satisfy a threshold, direct the one or more substitute tickets to the ticket holder.

16. The non-transitory, computer-readable medium of claim 15, wherein in response to all of the one or more substitute tickets having a confidence level that does not satisfy the threshold, the one or more substitute tickets is directed to the ticket holder instead of automatically accepting one of the one or more substitute tickets that have a confidence level that satisfies the threshold.

17. The non-transitory, computer-readable medium of claim 15, wherein the one or more substitute tickets are further determined based on the purchasing history of the ticket holder.

18. The non-transitory, computer-readable medium of claim 15, wherein the operations further comprise:
   obtain a selection by the ticket holder of the one or more substitute tickets; and
   update the purchase history of the ticket holder based on the selection by the ticket holder.

19. The non-transitory, computer-readable medium of claim 15, wherein the one or more substitute tickets to the event are determined using the one or more rules.

20. The non-transitory, computer-readable medium of claim 15, wherein the operations further comprise adapt the one or more rules based on an event genre of the event, wherein the one or more substitute tickets to the event are determined using the one or more rules as adapted.

* * * * *